US008205576B2

(12) United States Patent
Theis et al.

(10) Patent No.: US 8,205,576 B2
(45) Date of Patent: Jun. 26, 2012

(54) ANIMAL LITTER CONTAINING TWISTED PAPER RODS AND METHOD OF PROVIDING A DOMESTICATED ANIMAL WITH MENTAL STIMULATION

(75) Inventors: Dale R. Theis, Sylvania, OH (US); Ted A. Weaver, Perrysburg, OH (US)

(73) Assignee: The Andersons, Inc., Maumee, OH (US)

(*) Notice: Subject to any disclaimer, the term of this patent is extended or adjusted under 35 U.S.C. 154(b) by 947 days.

(21) Appl. No.: 11/939,689

(22) Filed: Nov. 14, 2007

(65) Prior Publication Data

US 2008/0110404 A1 May 15, 2008

Related U.S. Application Data

(60) Provisional application No. 60/865,714, filed on Nov. 14, 2006.

(51) Int. Cl.
*A01K 29/00* (2006.01)
(52) U.S. Cl. ........................ 119/171; 119/172
(58) Field of Classification Search .......... 119/707–711, 119/161, 163, 165–173, 174; 426/2, 3
See application file for complete search history.

(56) References Cited

U.S. PATENT DOCUMENTS

| | | | | |
|---|---|---|---|---|
| 4,157,696 A | * | 6/1979 | Carlberg | 119/172 |
| 4,326,481 A | * | 4/1982 | Gruss | 119/171 |
| 4,619,862 A | * | 10/1986 | Sokolowski et al. | 428/221 |
| 5,566,642 A | * | 10/1996 | Ochi | 119/171 |
| 5,641,482 A | * | 6/1997 | Sugo | 424/76.6 |
| 5,698,293 A | * | 12/1997 | Nordlund et al. | 428/153 |
| 5,894,815 A | | 4/1999 | Hamilton | |
| 5,909,718 A | | 6/1999 | Sheehan | |
| 6,405,676 B1 | * | 6/2002 | Mochizuki | 119/171 |
| 2001/0027755 A1 | * | 10/2001 | Denesuk et al. | 119/709 |
| 2004/0224053 A1 | * | 11/2004 | Markham et al. | 426/2 |
| 2006/0153948 A1 | * | 7/2006 | Markham et al. | 426/2 |

* cited by examiner

*Primary Examiner* — Kimberly Berona
*Assistant Examiner* — Danielle Clerkley
(74) *Attorney, Agent, or Firm* — Patent Procurement Services

(57) ABSTRACT

An animal litter is provided for simultaneously delivering urine-absorbent and mental-stimulating properties of the litter. The litter includes in combination a plurality of urine-absorbent particles forming a litter particulate component and a plurality of unfoldable polymeric cylinders constituting a polymeric cylinder component and intermixed with the urine-absorbent particles. The polymeric cylinders have a mean cylinder height of between 1 and 30 millimeters, a ratio of cylinder height to cylinder diameter of 1:1 to 12:1, and a strip length to cylinder height ratio of greater than 10:1. The litter particulate component is present relative to the cylinders in a volume ratio of 1:1 to 25:1. The litter provides mental stimulation and boredom reduction of a caged animal.

11 Claims, 3 Drawing Sheets

ANIMAL LITTER CONTAINING TWISTED PAPER RODS AND METHOD OF PROVIDING A DOMESTICATED ANIMAL WITH MENTAL STIMULATION

RELATED APPLICATIONS

This application is a non-provisional application claiming priority of U.S. Provisional Application 60/865,714 filed Nov. 14, 2006, the contents of which are incorporated herein by reference.

FIELD OF THE INVENTION

The present invention in general relates to animal litter, and in particular to animal litter containing twisted paper cylinders, the unfolding of which providing an animal with a degree of mental stimulation.

BACKGROUND OF THE INVENTION

There is a growing body of evidence that domesticated animals and in particular laboratory animals exhibit behaviors that in humans are associated with sensory deprivation and depression. These abnormal behaviors not only impact the well-being of an individual animal but also have implications in studies involving such an animal owing to the physiological effects of sensory deprivation and depression. In humans, sensory deprivation and depression have an effect on metabolism, cognitive function, immune response and other parameters relevant to clinical studies. The ability to provide a laboratory animal with a degree of mental stimulation is hampered by the requirements of study protocols that attempt to avoid introduction of new reaction variables, as well as the requirement in many instances that only sterilized materials be brought into contact with a laboratory animal. Captive animals deserve an environment which is rich in social opportunity, mental stimulation, and physical challenges. Sterility conditions are typically enforced in instances where an animal has been immunocompromised or otherwise carries a genetic defect rendering an animal vulnerable to disease or infection.

With laboratory study requirements, litter provided to absorb animal urine and desiccate fecal material is one of a limited number of opportunities to provide a source of stimulation to a confined laboratory animal. Prior art attempts have been made to include folded squares of paper with the intention that the animal would occupy time delaminating and chewing or unfolding the small chips of paper. Unfortunately, such attempts met with limited success owing to the disinterest of mice (especially male species) and rats confined within laboratory cages to actually play with the folded squares of paper. The 1985 amendments to the Animal Welfare Act included provisions for the promotion of the psychological well-being of nonhuman primates and for exercise for dogs. Today, many research, teaching and testing facilities have established environmental enrichment programs for all animal species. (awic.nal.usda.gov/nal_display/index) are representative of this effort.

Sheehan (U.S. Pat. No. 5,909,718) teaches a method of making particulate absorbent material from waste paper for the use of the material as a base for animal bedding. The waste paper is shredded, mixed with water and a binder, and dried to form solid paper particles having a diameter of from about 0.05 to about 2.0 centimeters. These have met with limited acceptance owing to exposing laboratory animals to unknown substances associated with the waste nature of the paper, as well as the lack of play value afforded to animals.

Tucci (U.S. Pat. No. 4,038,944) provides a synthetic animal bedding in recognition of the fact that natural bedding material must be replaced periodically and is not reusable. Although having tried to solve prior problems associated with the reusability of natural straw bedding, Tucci disfavors straws and further requires that the synthetic plastic pieces be arranged relatively parallel to the ground or bottom surface.

Similarly, Mochizuki (U.S. Pat. No. 6,405,676) teaches a twisted paper cylindrical material as a urine-absorbing litter. However, this material has met with limited acceptance owing to a low density and asymmetric shape that makes scooping and handling difficult. Also, presumably owing to the uniformity of the material as being exclusively twisted paper cylinders, sensory deprived animals are observed to be indifferent to playing with the paper cylinders.

Thus, there exists a need for an animal litter product that engages the attention of a laboratory animal to occupy time and alleviate some of the symptoms associated with sensory deprivation and depression. There further exists a need for such a litter capable of being sterilized and still functioning as an effective animal litter product.

SUMMARY OF THE INVENTION

An animal litter is provided for simultaneously delivering mental-stimulating and urine-absorbent properties of the litter. The litter includes in combination a plurality of urine-absorbent particles forming a litter particulate component and a plurality of unfoldable polymeric cylinders constituting a polymeric cylinder component and intermixed with the urine-absorbent particles. The polymeric cylinders are made of materials illustratively including cellulose, alkoxylated cellulose, alginate, starch, and synthetic polymers. The polymeric cylinders have a mean cylinder height of between 1 and 30 millimeters, a ratio of cylinder height to cylinder diameter of 1:1 to 12:1, and a strip length to cylinder height ratio of greater than 10:1. The litter particulate component is present relative to the cylinders in a volume ratio of 1:1 to 25:1.

A process is further provided to mental stimulation and boredom reduction of a caged animal. The process includes providing the animal with the above inventive litter and allowing sufficient time for the animal to unfold a portion of the polymeric cylinders.

DESCRIPTION OF THE INVENTION

The present invention has utility as an animal litter. With the inclusion of polymeric cylinders that an animal unfolds to form a strip, an activity is provided to the animal that occupies time and appears to alleviate behaviors associated with cage confinement. The resultant unfolded strips are routinely fashioned into nesting material by animals.

As used herein, the term "polymeric cylinder" is defined to include at least one ply of fibrous material axially wound, folded and wound, twisted, and combinations thereof into a cylindrical shape. It is appreciated that the polymeric cylinder is readily compression deformed asymmetrically to provide an overall conical or truncated conical shape. The fibrous material illustratively includes cellulose, alkoxylated cellulose, alginate, starch, polyethylene, polypropylene, polyvinyl, polystyrene, Spandex, Lycra, rubber, fleece, or any combinations thereof.

As used herein, an "animal" is defined to include a rodent such as a mouse, rat, hamster, gerbil, and rabbit; a bird such as a quail, chicken, turkey, parrot, parakeet, canary, and finch: felines, such as domesticated cats; and a primate such as a monkey, chimpanzee, and gorilla.

As used herein, the term "unfoldable" means the state of a polymeric cylinder capable of being extended wholly or partially to form a sheet strip.

An inventive animal litter includes in combination a group of urine-absorbent particles forming a litter particulate component and a group of unfoldable polymeric cylinders constituting a polymeric cylinder component, whereas the cylinders are intermixed with the urine-absorbent particles.

Figure 1:
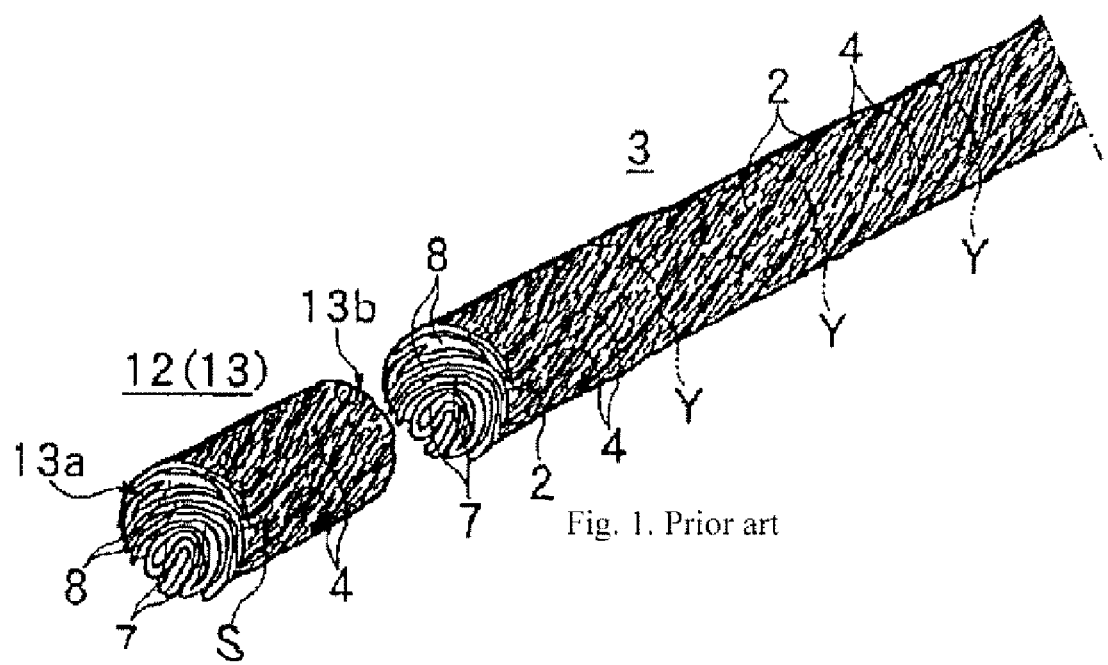
FIG. 1 is a perspective view of a prior art twisted paper rod.
Figure 2:
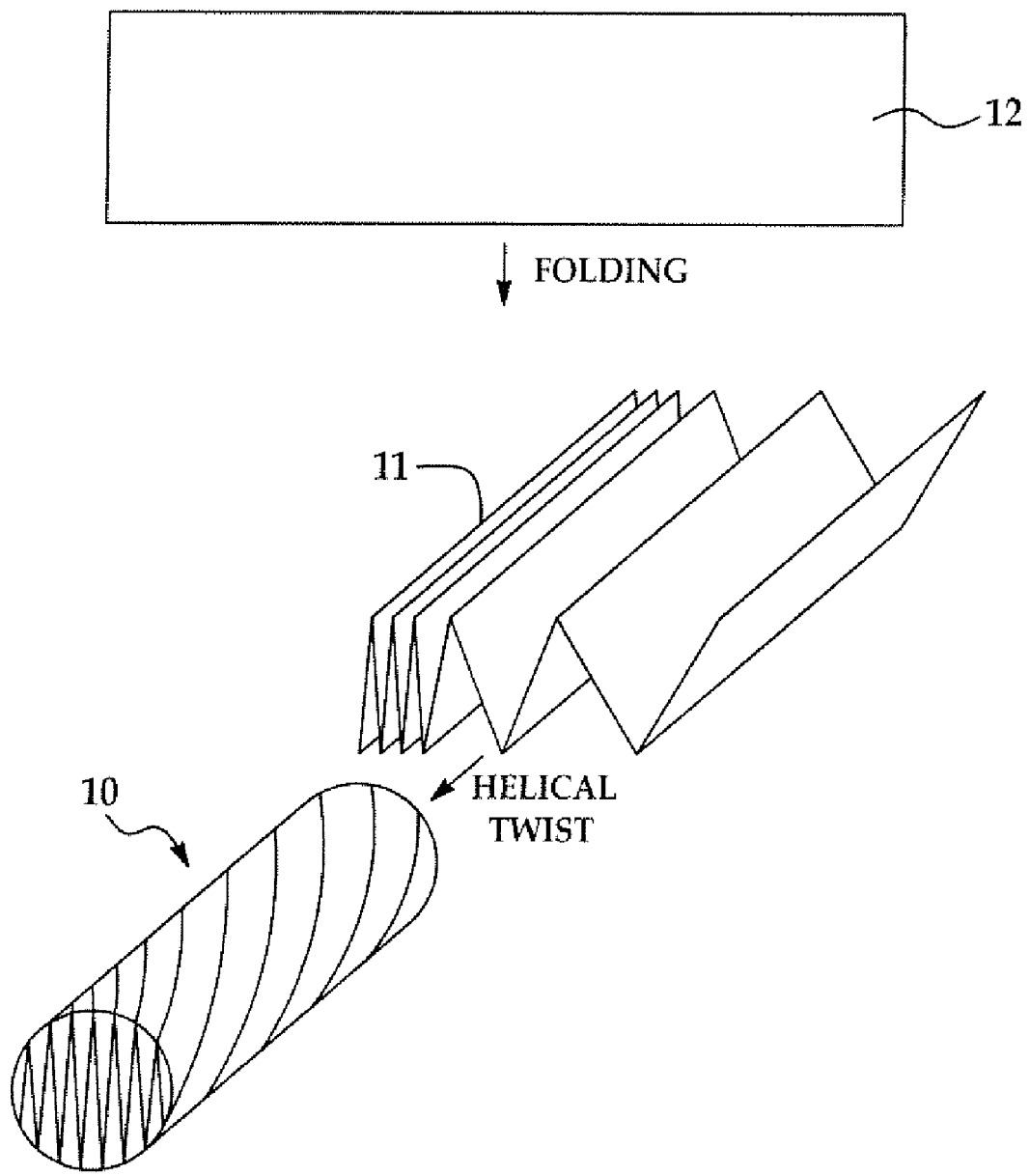
FIG. 2 is a schematic showing the folding and twisting to form a polymeric fiber cylinder.

The unfoldable polymeric cylinders retain moisture-absorbent properties necessary for an animal litter while providing an activity for an animal in contact with inventive litter. An inventive polymeric cylinder is absorbent of urine and formed of a material illustratively including cellulose, alkoxylated cellulose, polyvinyl alcohol, alginate, and starch. Preferably, the polymeric cylinder is formed of cellulosic paper. In the event where the unfoldable polymeric cylinders of an inventive litter are concurrently urine absorbent, the cylinders are preferably made of cellulose paper. A twisted fiber sheet rod is well known to the art and depicted in prior art FIG. 1 excerpted from U.S. Pat. No. 6,405,676. Alternatively, an axially wound polymeric cylinder is formed by rolling one or more material sheets around a central dowel, crimping or adhesively packing the free end of the sheet to the roll and cutting the resultant roll into a cylinder of a desired length. An axially wound polymeric cylinder at formation is depicted in FIG. 2 at 10 as being formed by helically twisting a folded sheet 11 from a sheet strip 12. It is appreciated that the unfoldable polymeric cylinders of an inventive litter are able to absorb per unit area more liquid than a corresponding folded rectilinear structure formed of the same material.

A group of unfoldable polymeric cylinders according to the present invention has a mean height between 1 and 30 millimeters. It is appreciated that the mean height of the cylinders is chosen with recognition as to the size and dexterity of the animal using the inventive litter. When fully unfolded and extended, each, polymeric cylinder has a strip length. The strip length is at least 10 times the height of a given polymeric cylinder. By way of example, a 3 millimeter high cylinder is formed through twisting, enveloping or rolling a polymeric sheet strip at least 30 millimeters in length. More preferably, the sheet material length is at least 15 times the cylinder height. Still more preferably, regardless of the number of sheets enveloped within a given cylinder, a ratio of cylinder height to cylinder diameter is from 1:1 to 12:1.

A group of unfoldable polymeric cylinders constitutes a polymeric cylinder component of an inventive animal litter and is preferably amenable to sterilization for use in conjunction with immunocompromised or genetically mutated laboratory animal models for disease. The sterilization techniques operative with the polymeric cylinder component of an inventive litter illustratively include gamma radiation and thermal sterilization techniques such as those involving superheated steam or heated air. It is appreciated that sterilization of the polymeric cylinder component can occur separately or in concert with the particulate litter component.

The polymeric cylinder component of an inventive litter is amenable to incorporation of various adjuvants operative to enhance litter performance and/or entertainment value. Adjuvants suitably incorporated into the polymeric cylinder component of an inventive animal litter illustratively include fragrances; dyes; odor suppressants such as baking soda; superabsorbent polymer granules; flavorants such as sugar and fruit flavors; and nutrients. In the instance where a polymeric cylinder component includes entertainment value enhancing adjuvants such as dyes or flavorants, it is appreciated that the stimulation value is enhanced by irregular distribution of the adjuvant. Irregular distribution is readily achieved by exposing the polymeric cylinder along one edge or diameter for an amount of time sufficient to create an incomplete penetration of the adjuvant into the polymeric cylinder. It is appreciated that an adjuvant is readily applied in the form of a solid, liquid, or solution with excess moisture being removed to arrive at a polymeric cylinder component moisture component with a preselected level.

The litter particulate component of an inventive litter includes pellets or granules of a litter material illustratively including bentonite clay, corncob, paper fluff, as paper pellets, wood shavings, wood chips, wood pellets and derivatives thereof, diatomaceous earth, grass, straw, soy hulls, sunflower hulls, oat hulls, rice hulls, corn stalks, pecan shells, corn husks, spelt hulls, wheat chaff, dried distillers grain, and combinations thereof. Typical particle sizes of particulate component to an inventive litter have a mean particle size of between 4 and 40 U.S. standard mesh. Particulate litter component in addition to the role as an absorbent also serves in the present invention to disperse and partly hide polymeric cylinders so as to create an activity for a proximal animal to uncover and thereafter unravel a polymeric cylinder. Representative particulate litter component compositions and methods of formation, are provided in U.S. Pat. Nos. 5,000,115; 6,053,125; 5,064,407; and 5,062,954. It is well known through observation that animals are afforded virtually no sensory stimulation through interaction with particulate litter. In order to provide the desired mental stimulation to an animal, the particulate component is present in a volume ratio relative to the polymeric cylinder component of from 1:1 to 25:1.

The unfoldable polymeric cylinders of the present inventive litter are preferably combined to the litter particulate component prior to their being presented to an animal in the form of a bedding so that the number of times when the animal has to be disturbed for the delivery of the bedding material is kept at a minimum. It is also recognized additional cylinders are optionally supplied to the animal independent of a litter change. Depending on the number, size, and physiological conditions of animals housed in a cage or simply when a portion of the existing cylinders are wet due to urine retention, a supplemental supply of unfoldable polymeric cylinders is optionally provided. It is understood that the supplemental supply is composed of cylinders that optionally differ from the replaced cylinders in at least one aspect with the aspect illustratively including texture, color, smell, shape, or any combination thereof. By way of example, a soft rubber cylindrical roll with or without a fragrance patch is provided to the animal in a litter composition to replace an old cylinder component made of paper. This is intended to offer additional stimulation while maintaining the manageability of replacing an animal litter.

An animal, when provided with the present inventive litter, engages an activity to reduce boredom, anxiety and to enhance mental stimulation. The activity involves relocation of polymeric cylinders from the inventive litter and systematic turning and unfolding of the cylinders to yield a polymeric strip. Typically, an animal removes one or more polymeric cylinders from one location within the cage to another. Preferentially such cylinders have not as yet been saturated with urine.

An animal exposed to an inventive litter, in particular a rodent, is observed to initially begin chewing an inventive litter polymeric cylinder. Upon the animal discovering that the cylinder begins to unravel, animal handling and chewing of a polymeric cylinder becomes purposeful with the intent of rendering a cylinder as a strip. The strips formed from unfolding polymeric cylinders are then taken by the animal to be segregated from the particulate component of the litter and to be used to form a hiding place as well as bedding. The inventive litter replaces manufactured rigid hiding places with a more instinctively sought and natural material to the animal.

Figure 3:
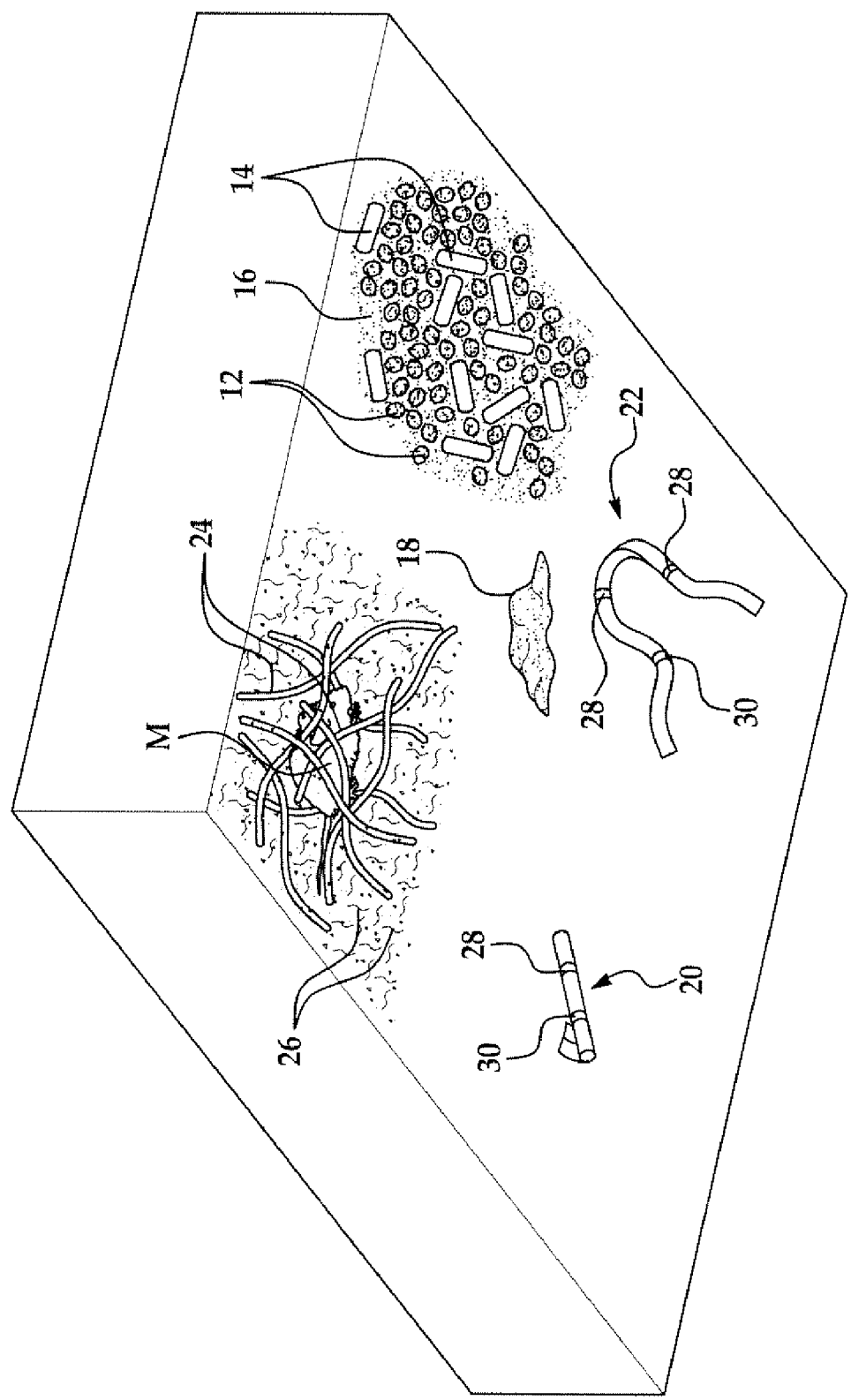
FIG. 3 is a perspective representation of laboratory animal manipulation of an inventive litter.

As shown with reference to FIG. 3, the inventive animal litter as provided to an animal contains particulate component 12 and polymeric cylinder component 14. An animal, a mouse M as depicted in FIG. 3, begins to interact with the inventive litter collectively depicted at 16. The animal M chews polymeric cylinder 14 to produce a macerated polymeric mass 18. Typically the animal M begins to unravel cylinders to form partially unraveled polymeric fiber cylinders 20 and eventually succeeds in creating only unraveled polymeric fiber strips 22. The strips 22, partially unraveled cylinders 20 and macerated mass 18 in varying amounts are formed as a shelter 24 and/or a bedding mass 26. A surprising aspect of the present invention is that male rodents, which are more likely to exhibit abhorrent and antisocial behavior, are also observed to engage in apparent play behavior with the polymer fiber cylinder component of an inventive litter. The periodic inclusion of flavorant patches 28 and to a lesser extent colorimetric zones 30 along the length of a polymeric fiber strip formed into a cylinder is noted to enhance animal interest in the inventive litter.

EXAMPLES

Example 1

Prior Art Bedding of Twisted Paper Rods Alone Versus the Inventive Litter Combining Both the Litter Particulate Component and the Unfoldable Polymeric Cylinders 200 grams of twisted paper rods of a mean length of 10 millimeters and a mean diameter of 5 millimeters per U.S. Pat. No. 6,405,676 are laid flat on the bottom of each of the five separate cages of the comparative group. A total 200 grams of an inventive litter is laid flat on the bottom of five separate cages of the inventive group. The inventive litter is composed of 20 grams of the twisted paper rods per U.S. Pat. No. 6,405,676 and 180 grams of dry corncob particulate with a mean size of 2.5 millimeters intermixed with the cylinders. All cages are structurally identical and kept in isolation. To each cage, a male rat with comparable weight, age, and physiological conditions is placed.

The following experimental parameters are examined: the first play period before the first resting observed; the length of the first resting segment; the second play period between the first two resting segments; and the length of the second resting segment. Table I illustrates the results of the experiment. The term "play period" refers to a period of time in minutes during which a rodent is relatively continuously touching, kicking, and rolling the bedding object. The term "resting segment" refers to a period of time during which a rodent is in an idling position such as lying down, sitting, or merely walking. Each time period is presented as an average of five independent readings. Table I shows the relevant results with regard to this experiment.

TABLE I

|  | Average for Comparative Group | Average for Inventive Group |
| --- | --- | --- |
| First period | 8 minutes | 15 minutes |
| First resting segment | 5 minutes | 4 minutes |
| Second play period | 5 minutes | 15 minutes |
| Second resting segment | 10 minutes | 6 minutes |

The substantial prolongation in playing times associated with the inventive litter is due to the following factors. The rodents in the inventive group first spend a good portion of time in digging and segregating the paper cylinders away from the rest of the corncob component. After the relocation is done, the rodent starts peeling and unfolding the paper cylinders. Later, the rodent remixes the partially unraveled paper cylinders with the corncob. It is noticed that no activities of intentional segregating and remixing are observed with the rodent in the comparative group.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:
1. An animal litter comprising in combination:
a plurality of urine-absorbent particles forming a litter particulate component; and
a plurality of unfoldable polymeric cylinders constituting a polymeric cylinder component and intermixed with said plurality of urine-absorbent particles to form the animal litter that induces extended play time in a laboratory animal relative to either said litter particulate component or said polymeric cylinder component alone.
2. The litter of claim 1 wherein said plurality of polymeric cylinder have a mean cylinder height of between 1 and 30 millimeters.
3. The litter of claim 1 wherein said plurality of polymeric cylinders have a ratio of cylinder height to cylinder diameter of 1:1 to 12:1.
4. An animal litter comprising in combination:
a plurality of urine-absorbent particles forming a litter particulate component: and
a plurality of unfoldable polymeric cylinders constituting a polymeric cylinder component and intermixed with said plurality of urine-absorbent particles to form the animal litter that induces extended play time in a laboratory animal relative to either said litter particulate component or said polymeric cylinder component alone;
wherein a volume ratio of the litter particulate component to polymeric cylinder component is between 1:1 to 25:1.
5. The litter of claim 1 wherein said plurality of urine-absorbent particles is of a type selected from the group consisting of bentonite clay, corncob, paper fluff, paper pellets, wood shavings, wood chips, wood pellets and derivatives thereof, diatomaceous earth, grass, straw, soy hulls, sun- flower hulls, oat hulls, rice hulls, corn stalks, pecan shells, corn husks, spelt hulls, wheat chaff, citrus pulp, nut hulls and combinations thereof.

6. The litter of claim 1 wherein said plurality of polymeric cylinders have a strip length to cylinder height ratio of greater than 10:1.

7. The litter of claim 1 wherein at least a portion of said plurality of polymeric cylinders is made of twisted paper.

8. The litter of claim 1 wherein at least a portion of said plurality of polymeric cylinders is made of a material selected from the group consisting of cellulose, alkoxylated cellulose, alginate, starch, polyethylene, polypropylene, polyvinyl, polystyrene, Spandex, Lycra, rubber, fleece, and any combinations thereof.

9. The litter of claim 1 wherein at least a portion of said plurality of polymeric cylinders has a plurality of spaced zones that vary in a property selected from the group consisting of: dye coloring, flavorant concentration, and any combinations thereof.

10. The litter of claim 1 wherein the laboratory animal is a rodent.

11. An animal litter comprising in combination:
  a plurality of urine-absorbent particles forming a litter particulate component: and
  a plurality of unfoldable polymeric cylinders constituting a polymeric cylinder component and intermixed with said plurality of urine-absorbent particles to form the animal litter that induces extended play time in a laboratory animal relative to either said litter particulate component or said polymeric cylinder component alone;
  wherein at least a portion of said plurality of polymeric cylinders is made of axially wound paper.

* * * * *